(12) United States Patent  (10) Patent No.: US 8,176,941 B2
Warnica et al.  (45) Date of Patent: May 15, 2012

(54) APPARATUS FOR STABILIZATION AND DECELERATION OF SUPERSONIC FLOW INCORPORATING A DIVERGING NOZZLE AND PERFORATED PLATE

(75) Inventors: David Warnica, Mississauga (CA); Albert J. Koning, Stoney Creek (CA); Michael Franceschini, Mississauga (CA); Jennifer Woloshyn, Toronto (CA)

(73) Assignee: Hatch Ltd., Mississauga (CA)

( * ) Notice: Subject to any disclaimer, the term of this patent is extended or adjusted under 35 U.S.C. 154(b) by 315 days.

(21) Appl. No.: 12/628,621

(22) Filed: Dec. 1, 2009

(65) Prior Publication Data

US 2010/0071793 A1 Mar. 25, 2010

Related U.S. Application Data

(63) Continuation of application No. PCT/CA2008/001364, filed on Jul. 25, 2008.

(51) Int. Cl.
    *F15D 1/02* (2006.01)
(52) U.S. Cl. .......................... 138/44; 138/94.3
(58) Field of Classification Search .............. 138/44, 138/94.3
    See application file for complete search history.

(56) References Cited

U.S. PATENT DOCUMENTS

| 2,271,764 A * | 2/1942 | Heil .............................. 239/596 |
| 2,687,147 A * | 8/1954 | Feichter .......................... 138/44 |
| 3,171,507 A | 3/1965 | Klingel |
| 3,491,850 A | 1/1970 | Heitner |
| 3,518,052 A | 6/1970 | Foulds |
| 3,665,965 A | 5/1972 | Baumann |
| 3,721,785 A | 3/1973 | Picard et al. |
| 3,889,776 A | 6/1975 | Postma |
| 3,995,189 A | 11/1976 | Haslund |
| 4,000,869 A | 1/1977 | Wong et al. |
| 4,056,789 A | 11/1977 | Stregack et al. |
| 4,099,503 A | 7/1978 | Casey |
| 4,102,600 A | 7/1978 | Schwab |
| 4,113,050 A | 9/1978 | Smith |
| 4,130,173 A | 12/1978 | Cooksey |
| 4,182,660 A | 1/1980 | Zimmer et al. |
| 4,200,819 A | 4/1980 | Haslund |
| 4,235,707 A | 11/1980 | Burke, Jr. |
| 4,273,564 A | 6/1981 | Sugie |
| 4,291,743 A | 9/1981 | Aftalion |
| 4,350,661 A | 9/1982 | Davis et al. |
| 4,363,237 A | 12/1982 | Creel, Jr. et al. |

(Continued)

FOREIGN PATENT DOCUMENTS

CA 2 233 072 5/2004

(Continued)

*Primary Examiner* — James Hook
(74) *Attorney, Agent, or Firm* — K&L Gates LLP

(57) ABSTRACT

An apparatus is disclosed for reducing pressure and velocity of a particulate-laden, supersonic vent gas stream from a pressure vessel such as an autoclave. The apparatus includes a diverging duct in which the vent gas expands, and a perforated plate located inside the diverging duct. The perforated plate provides an area reduction that increases back pressure and forces an upstream normal shock in the diverging duct, thereby bringing about a desired reduction in pressure and velocity. The perforated plate is comprised of a material, such as a ceramic, that is resistant to erosion by the abrasive particulate entrained in the high velocity vent gas. The perforated plate has a central portion provided with holes and an imperforate peripheral portion which is resiliently received between connection flanges of the duct.

16 Claims, 12 Drawing Sheets

U.S. PATENT DOCUMENTS

| | | | |
|---|---|---|---|
| 4,414,488 A | 11/1983 | Hoffmann et al. | |
| 4,421,476 A * | 12/1983 | Gulden et al. | 431/243 |
| 4,762,540 A | 8/1988 | Ruiz et al. | |
| 4,814,187 A * | 3/1989 | Inoue et al. | 425/464 |
| 4,849,983 A | 7/1989 | Boivineau et al. | |
| 4,991,795 A | 2/1991 | Koncsek | |
| 4,994,903 A | 2/1991 | Wroe et al. | |
| 5,018,688 A | 5/1991 | Stallings, Jr. et al. | |
| 5,166,479 A | 11/1992 | Gras et al. | |
| 5,266,754 A | 11/1993 | Swift | |
| 5,306,330 A | 4/1994 | Nasikas | |
| 5,378,435 A * | 1/1995 | Gavoni | 422/177 |
| 5,630,680 A | 5/1997 | Basak et al. | |
| 5,735,469 A | 4/1998 | Rodriguez et al. | |
| 5,779,985 A | 7/1998 | Sucholeiki | |
| 5,881,758 A | 3/1999 | Koncsek et al. | |
| 5,934,607 A | 8/1999 | Rising et al. | |
| 5,971,000 A | 10/1999 | Koncsek et al. | |
| 6,003,301 A | 12/1999 | Bratkovich et al. | |
| 6,143,215 A | 11/2000 | McCollum et al. | |
| 6,203,269 B1 | 3/2001 | Lorber et al. | |
| 6,277,332 B1 | 8/2001 | Sucholeiki | |
| 6,523,573 B2 * | 2/2003 | Robison et al. | 138/44 |
| 6,694,808 B2 | 2/2004 | Sawada et al. | |
| 6,966,769 B2 | 11/2005 | Elvander et al. | |
| 6,968,923 B2 | 11/2005 | Schmaeman | |
| 6,988,705 B1 | 1/2006 | Hoose | |
| 7,237,574 B2 * | 7/2007 | Chipman et al. | 138/44 |
| 7,290,931 B2 | 11/2007 | Wardman et al. | |
| 7,845,688 B2 * | 12/2010 | Gallagher et al. | 285/412 |

FOREIGN PATENT DOCUMENTS

| | | |
|---|---|---|
| EP | 0 001 216 B1 | 8/1978 |
| EP | 0 891 022 A1 | 1/1999 |
| EP | 0 891 023 B1 | 1/2001 |
| EP | 1 159 533 B1 | 11/2003 |
| EP | 0 799 982 B1 | 3/2005 |

* cited by examiner

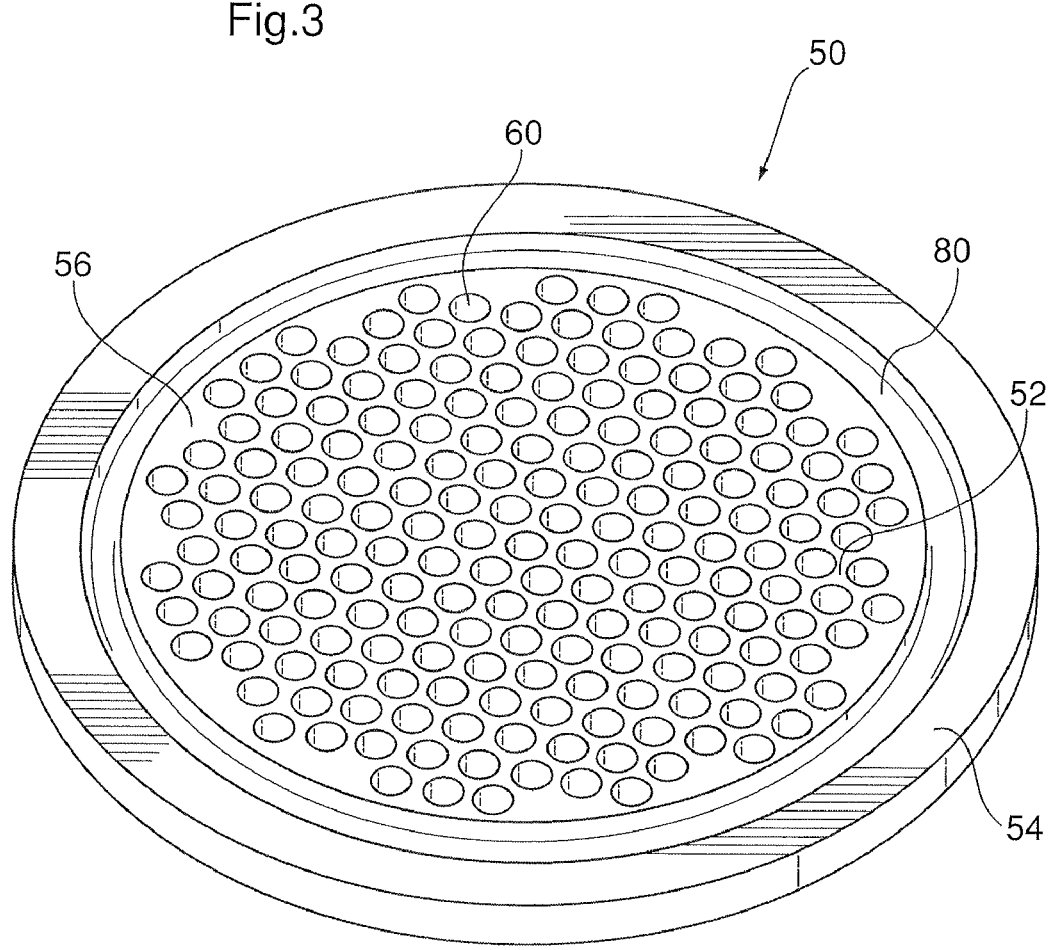

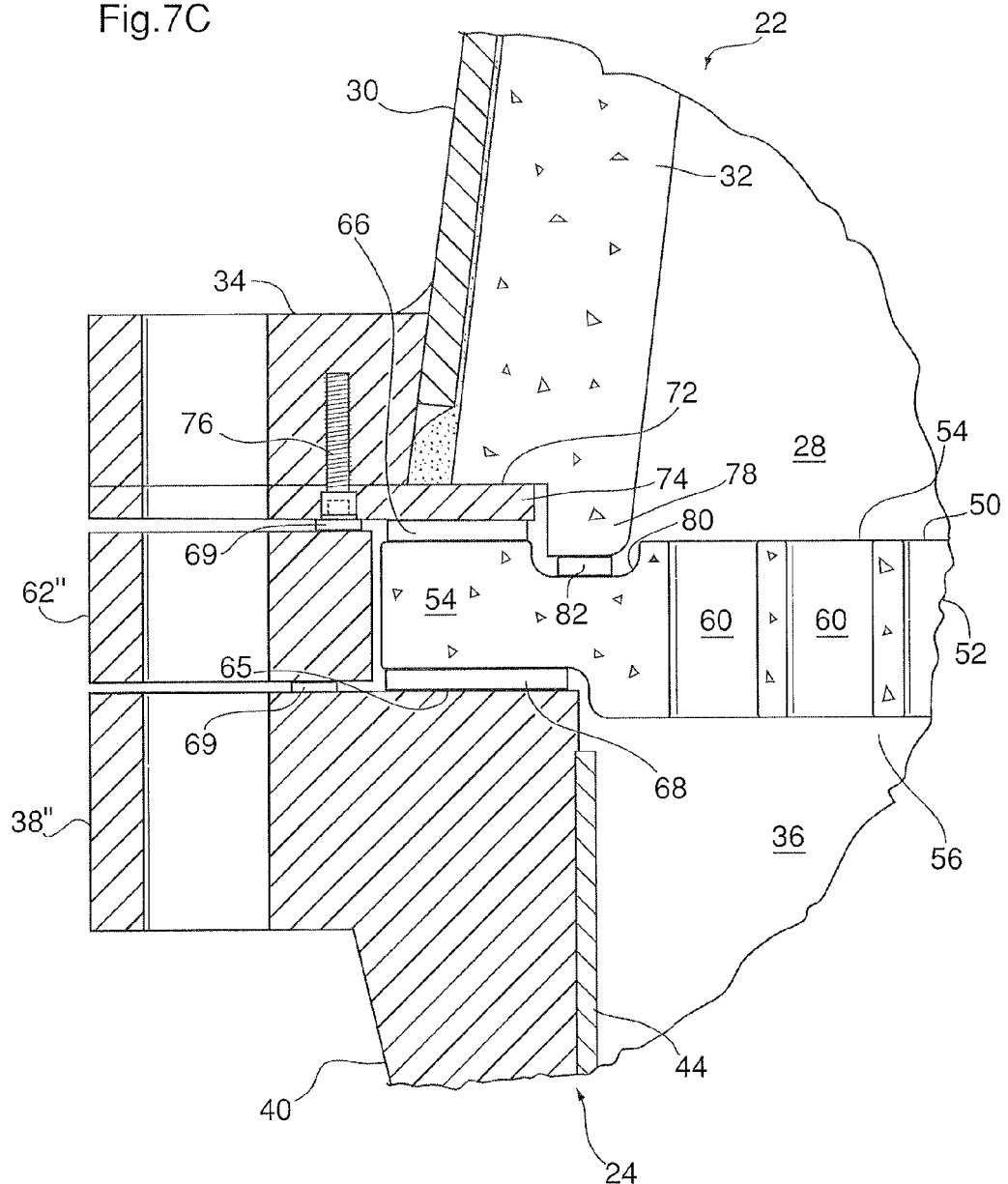

APPARATUS FOR STABILIZATION AND DECELERATION OF SUPERSONIC FLOW INCORPORATING A DIVERGING NOZZLE AND PERFORATED PLATE

CROSS-REFERENCE TO RELATED APPLICATIONS

This application is a continuation of International Application No. PCT/CA2008/001364, filed on Jul. 25, 2008, now pending.

FIELD OF THE INVENTION

This invention relates to an apparatus for stabilizing and decelerating a supersonic gas flow, such as a vent gas stream from a high pressure process vessel.

BACKGROUND OF THE INVENTION

Autoclaves used in hydrometallurgical processes may be operated at very high pressures, approximately 40 bar (about 600 psi). The vent gases discharged by the autoclave, consisting primarily of superheated steam and containing solid particulate, are also at very high pressure. In a typical process, the autoclave vent gases must be cooled or condensed in a quench vessel containing a pool consisting primarily of water from condensed steam. The quench vessel operates at pressures close to atmospheric pressure, on the order of about 0.15 bar (g).

When high pressure vent gases from an autoclave expand downstream of the vent control valve located at the inlet nozzle of the quench vessel, the gases are accelerated to supersonic speeds. Compressible flow theory predicts a diverging pipe section will accelerate the supersonic jet toward the quench vessel, resulting in deep penetration of the pool or causing excessive splashing and wear on the quench vessel walls. Due to the entrained particulate in the vent gases, the quench vessel walls can be eroded in a very short time. The quench vessel may be provided with sacrificial impingement plates located in the path of the incoming vent gas stream, but these plates are eroded quickly and must be replaced frequently to avoid damage to the vessel walls.

SUMMARY OF THE INVENTION

It is impossible to decelerate and stabilize a supersonic jet using a conventional diverging duct so a device is necessary to induce a normal shock in the blast shroud. The supersonic jet would then decelerate through the fixed shock; the remaining length of the duct would act as a subsonic diffuser such that the jet enters the quench vessel with a reduced velocity. The inventors have found that incorporating a perforated plate into the diverging blast shroud produces sufficient back pressure to induce a fixed normal shock, resulting in lower entry velocity and diminished turbulent-induced vibration.

In one aspect, the present invention provides an apparatus for reducing pressure and velocity of a supersonic vent gas stream from a pressure vessel, by means of a downstream area reduction that increases back pressure, thus forcing an upstream normal shock in a diverging duct. The apparatus comprises a duct extending along an axis and having an upstream portion and a downstream portion, wherein the upstream portion has an inlet for receiving the vent gas stream and diverges toward the downstream portion along at least a part of its length. The apparatus further comprises a perforated plate provided inside the duct. The perforated plate is axially positioned between the upstream and downstream portions of the duct, and has an upstream surface, an opposed downstream surface, a central portion and a peripheral portion, wherein the central portion of the perforated plate is provided with a plurality of holes extending through the perforated plate from the upstream surface to the downstream surface so as to permit the vent gas stream to flow through the perforated plate from the upstream portion of the duct to the downstream portion of the duct. The peripheral portion of the perforated plate is secured to the duct along the upstream and downstream surfaces of the perforated plate.

In an embodiment of the invention, the perforated plate comprises a unitary structure and is wholly comprised of a ceramic material.

In an embodiment of the invention, the holes in the central portion provide the perforated plate with a total open area which is about 40 percent to about 60 percent of the maximum internal area of the duct.

In an embodiment of the invention, the upstream downstream portions of the duct have radial flanges along which they are secured together, and wherein the peripheral portion of the perforated plate is resiliently secured between the radial flanges of the upstream and downstream portions.

In an embodiment of the invention, an annular support ring is provided between the downstream surface of the peripheral portion of the perforated plate and the radial flange of the downstream portion of the duct.

In an embodiment of the invention, a first body of resilient packing material is provided between the radial flange of the upstream portion of the duct and the upstream surface of the peripheral portion of the perforated plate, and a second body of resilient packing material is provided between the downstream surface of the peripheral portion of the perforated plate and an upstream surface of the support ring.

In an embodiment of the invention, a radial expansion gap is provided around the peripheral portion of the perforated plate.

In an embodiment of the invention, an annular groove is provided in the upstream surface of the perforated plate between the central portion and the peripheral portion thereof, wherein the groove is spaced radially inwardly of the radial flange of the upstream portion of the duct.

In an embodiment of the invention, the upstream portion of the duct has an annular lip which is located at its downstream end and is spaced radially inwardly from the radial flange, wherein the lip extends in a downstream direction into the groove of the perforated plate.

In an embodiment of the invention, a gap is provided between the annular lip and a lower surface of the groove, and a third body of resilient packing material is provided in the groove and sealingly engages both the annular lip and the upper surface of the perforated plate.

In an embodiment of the invention, the upper portion of the duct comprises an outer metal shell and an inner ceramic lining, the radial flange of the upper portion of the duct is attached to the outer metal shell, and the annular lip forms part of the inner ceramic lining.

In an embodiment of the invention, the downstream portion of the duct is cylindrical, but can be of any desired shape, and includes an outer sidewall which comprises a nozzle of a quench vessel. The outer sidewall has a first end on which the radial flange of the upstream portion is mounted, and a second end attached to the quench vessel and surrounding a vent gas inlet opening of the quench vessel.

In an embodiment of the invention, the downstream portion of the duct also includes an inner sidewall which is concentric with, and spaced from, the outer sidewall. The inner sidewall has a first end proximate to the lower surface of the perforated plate and a second end which extends into the vent gas inlet opening of the quench vessel.

In an embodiment of the invention, the first end of the inner sidewall has a diameter which is substantially the same as a diameter of the central portion of the perforated plate.

In an embodiment of the invention, the first end of the inner sidewall is attached to a radial flange which extends along the downstream surface of the peripheral portion of the perforated plate.

In an embodiment of the invention, the central portion of the perforated plate is thicker than the peripheral portion of the perforated plate.

In an embodiment of the invention, the holes in the central portion of the perforated plate are circular and are arranged in either a triangular or square pitch pattern, and the peripheral portion of the perforated plate is without holes.

BRIEF DESCRIPTION OF THE DRAWINGS

The invention will now be described, by way of example only, with reference to the accompanying drawings, in which:

FIG. 3 is a perspective view of a perforated plate according to the invention, showing its upstream surface;

FIGS. 7B and 7C are close-up views, similar to FIG. 7A, showing alternate spacer ring constructions;

DETAILED DESCRIPTION

An apparatus 10 according to the invention is now described with reference to the drawings.

Figure 1:
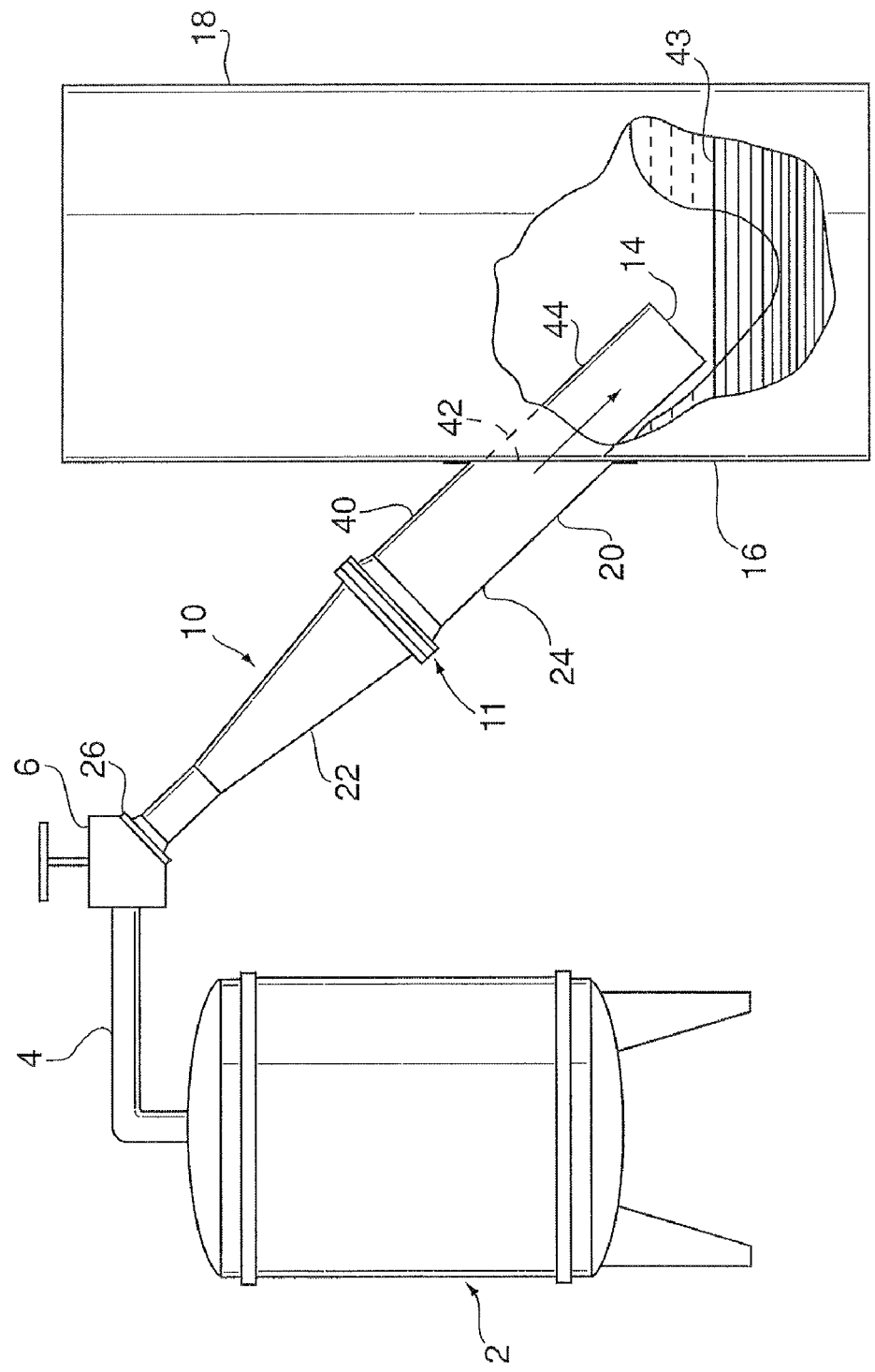
FIG. 1 schematically shows an apparatus according to the invention installed between an autoclave and a quench vessel.
Figure 2:
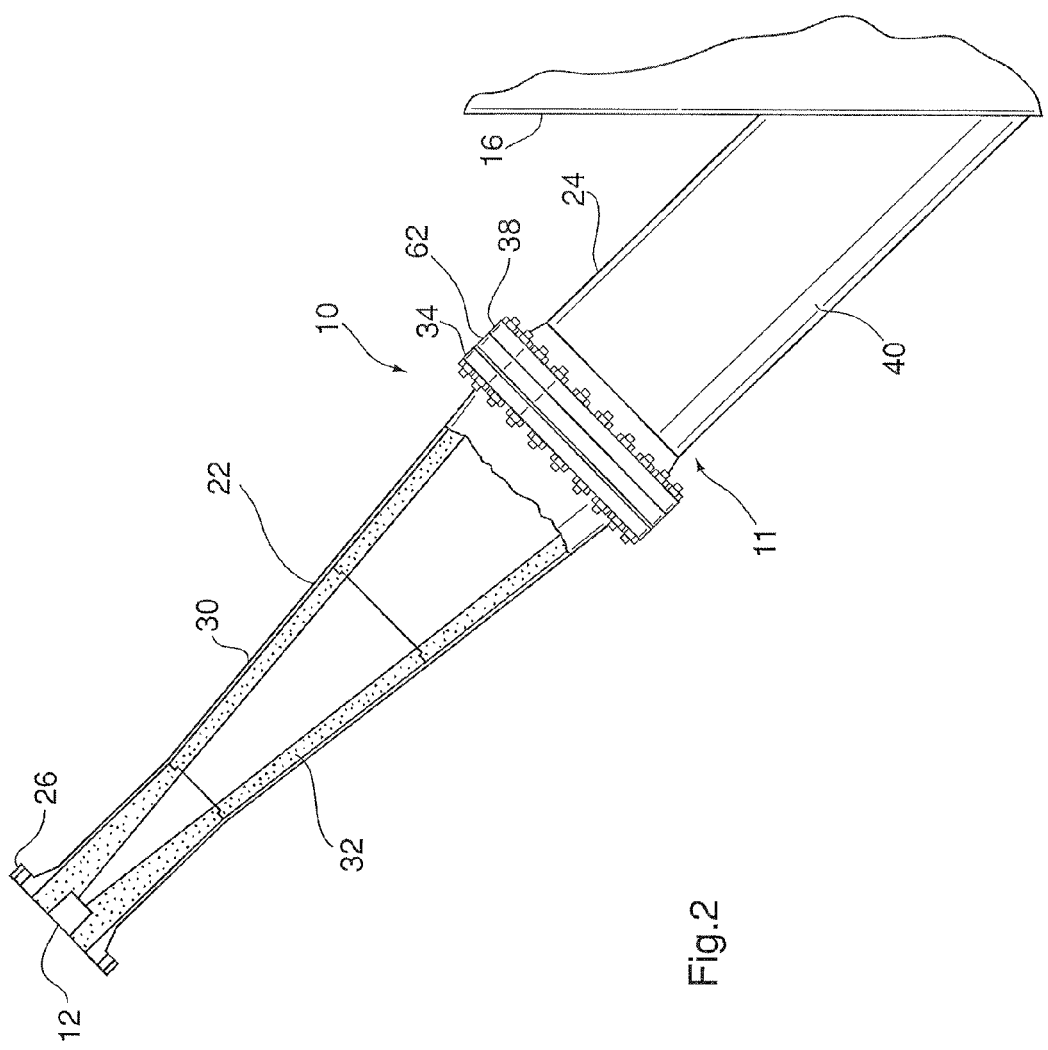
FIG. 2 is a partially cut away side view of the apparatus shown in FIG. 1.

Referring first to FIGS. 1 and 2, the apparatus 10 includes a duct 11, which is a hollow, elongate structure having an upstream section 22 of generally conical shape which receives vent gases at one end from an autoclave 2, and which is attached at its opposite end to the quench vessel inlet nozzle 20. The inlet nozzle 20 is connected to the outer wall 16 of a quench vessel 18. The depictions of the autoclave 2 and the quench vessel 18, and all other components which interact with apparatus 10, are greatly simplified so as to show only those elements which are necessary for an understanding of the invention.

In the following description, the terms "upstream" and "downstream" are used to define directions and orientations of certain components of apparatus 10. The upstream and downstream directions are defined in relation to an axis along which the vent gas flows through the duct 11 toward the quench vessel 18, wherein the vent gas flows along the axis in the downstream direction. The terms "inner", "outer", "inward" and "outward" and similar terms are used herein to refer to define directions and orientations of certain components of apparatus 10. The inner and outer directions are defined with respect to the radial dimension, which is transverse to the axis of gas flow.

The duct 11 has two main sections, an upstream section 22 and a downstream section 24. The upstream duct section 22 has an open upstream end which serves as an inlet 12 for the autoclave vent gases. The inlet 12 may be provided with an annular, radially extending inlet flange 26 for attachment to process piping 4 or a conventional pressure valve 6. The upstream duct section 22 also has an open downstream end 28 (FIG. 6) which is provided with a radially extending connection flange 34 for connection to the downstream duct section 24.

The upstream duct section 22 has an outer metal shell 30, usually made from or lined with a corrosion resistant material, which diverges in the downstream direction along at least a part of its length, and which defines an outside diameter of the upstream duct section 22. In the example shown in the drawings, the shell 30 has a straight portion, which may be cylindrical, adjacent to the inlet 12 and a divergent portion in the form of a truncated cone extending toward the downstream end 28 of section 22. Divergence of the upstream duct section 22 is desired so as to permit controlled expansion of the vent gases inside the duct 11 and thereby reducing the velocity of the vent gas stream. The opposite ends of metal shell 30 are connected to the radially extending inlet flange 26 and to the connection flange 34, for example by welding. The length and diameter of the upstream duct section 22 may depend at least partially on process and operating parameters. The length and diameter of the upstream duct section can vary, and depends on the location of the normal shock, required mass flow and the desired entry velocity of the vent gases. The actual dimensions of the upstream duct section 22 are therefore process specific.

The upstream duct section 22 also has an inner lining 32 comprised of a material which is resistant to erosion by the high velocity autoclave vent gas. In an embodiment of the invention, inner lining 32 is formed from a ceramic material, such as a nitride-bonded silicon carbide. The inner lining 32 defines an inside diameter of the upstream duct section 22, and may be comprised of one or more segments. The dimensions of the inner lining 32 are at least partially determined by the dimensions of the outer metal shell 30. In an embodiment of the invention, the inner lining 32 is made of a ceramic material and has a thickness of about 50 mm.

The inventors have found that the angle of divergence in the divergent portion of the upstream duct section, i.e. the total included angle between opposite sides of the upstream duct section, is preferably in the range between 7.5 and 15 degrees to prevent flow separation of the vent gas jet from the wall of the diffuser. In the example shown in the drawings, the required angle is about 12.5 degrees, for a pressure reduction ratio of 41:1.15 or 35.7:1.

Figure 8:
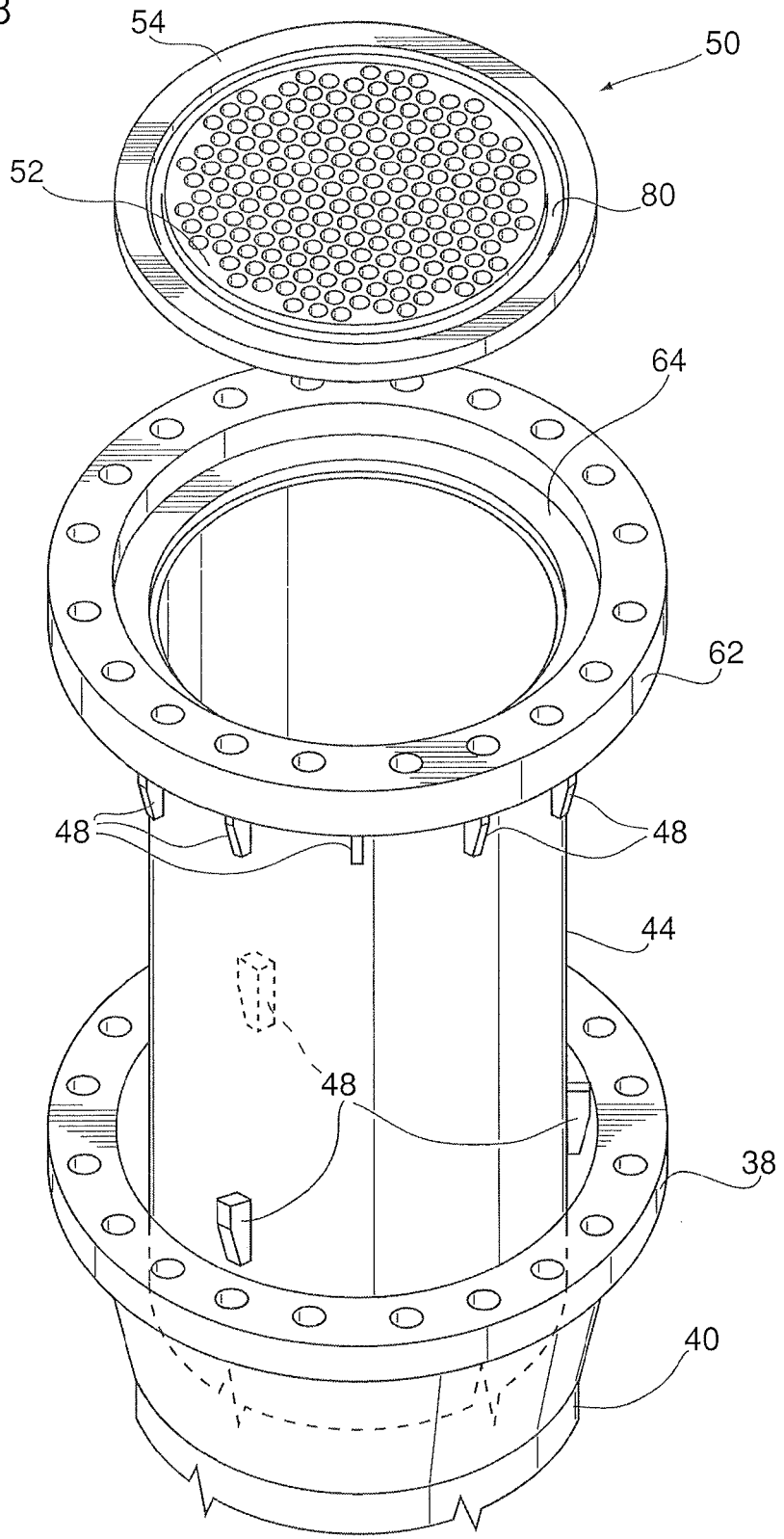
FIG. 8 is an exploded view of the shroud assembly and the components of the apparatus of FIG. 1 downstream of the perforated plate.

The structure of the downstream duct section 24 is now described with reference to FIGS. 2, 6 and 8. The downstream duct section 24 comprises an outer sidewall 40 made of a metal material to match the quench vessel. The outer sidewall 40 is shown in the drawings as being cylindrical, but it may be of any desired shape. Section 24 has an open upstream end 36, which is connected to a radially extending connection flange 38, for example by welding, and an open downstream end which serves as an outlet 14 for the autoclave vent gases. The outer sidewall 40 serves as a quench vessel inlet nozzle, with its downstream end being connected to the wall 16 of quench vessel 18, for example by welding, and enclosing a vent gas inlet opening 42 of quench vessel 18. The outer sidewall 40 is preferably attached to the quench vessel wall 16 at an angle so that the vent gas stream is directed toward the bottom of the quench vessel 18 which contains a pool 43 for receiving the vent gas. In an embodiment of the invention, the inside diameter of the outer sidewall 40 may be about the same as the maximum inside diameter of the metal shell 30.

The downstream duct section 24 further comprises an inner sidewall 44, also referred to herein as the "nozzle insert", which is concentric with and spaced inwardly from the outer sidewall 40. The inner sidewall 44 is shown in the drawings as being cylindrical, but it may be of any desired shape. The inner sidewall 44 protects the outer sidewall 40 from erosion by the vent gas and is replaceable. The inner sidewall 44 has an upstream end which is proximate to the connection flange 38 of downstream section 24, and a downstream end which may extend past the end of the quench vessel inlet nozzle and into the interior of the quench vessel 18, terminating above the pool surface 43. The outer surface of the inner sidewall 44 and/or the inner surface of the outer sidewall 40 may be provided with spacers 48 to maintain the concentric arrangement of the sidewalls 40, 44. The inside diameter of the inner sidewall 44 is slightly smaller than that of the outer sidewall 40. The inner sidewall 44 must have sufficient length to extend from the connection flange 38 through the quench vessel wall 16 and to the surface of the pool 43.

The apparatus 10 further comprises a perforated plate 50 which is located inside the duct 11 and extends radially across its entire open area. The perforated plate 50 is positioned between the upstream and downstream duct sections 22, 24, and is now described with reference to FIGS. 3, 4 and 5.

In the embodiment shown in the drawings, the perforated plate 50 is circular, having a disc-shaped central portion 52, which has an outside diameter substantially the same as the inside diameter of the duct 11 proximate to the downstream end 28 of the upstream duct section 22. The geometry and dimensions of perforated plate 50 are at least partially determined by the geometry of the duct 11. Encircling the central portion 52 of perforated plate 50 is an annular peripheral portion 54. The perforated plate 50 has an upstream surface 56 facing toward the inlet 12 of duct 11 and a downstream surface 58 facing toward the outlet 14 of duct 11.

The central portion 52 of perforated plate 50 is preferably flat, with the upstream and downstream surfaces 56, 58 being parallel to one another. The central portion 52 is provided with a plurality of holes 60, which extend through the perforated plate 50 from the upstream surface 56 to the downstream surface 58 so as to permit the vent gas stream to flow through the perforated plate 50 from the upstream duct section 22 to the downstream duct section 24. Because the perforated plate 50 occupies the entire cross-sectional area of duct 11, the vent gases are required to flow through holes 60 as they are conveyed through the duct 11.

The holes 60 are preferably cylindrical in shape with circular openings at the upstream and downstream surfaces 56, 58 of the perforated plate 50. The total open area of the perforated plate 50 is determined by the number and size of holes 60 in the central portion 52. The minimum total open area of the perforated plate 50 is that which provides a desired back pressure upstream of the perforated plate 50 and a desired exit velocity at the outlet 14, which may be determined, for example, by computational fluid dynamic (CFD) analysis of the vent gas flow. In one embodiment, the plurality of holes 60 in the central portion 52 of perforated plate 50 have a total open area that is between about 40 to 60 percent of the maximum internal area of duct 11. The exit area is determined by the desired exit velocity of the vent gas from the diverging upstream duct section 22. By selecting the desired exit velocity, an isentropic flow relationship can be used to calculate the required sonic throat area. The throat area and diffuser exit area will define the shock location in the upstream duct section 22. Isentropic pressure relations can be used to determine the required back pressure for the velocity condition selected above. Finally, Bernoulli's Principle (conservation of energy equation) and orifice plate theory can be used to calculate the open area required to generate the back pressure.

The maximum open area of perforated plate 50 is limited primarily by structural considerations. As the diameter and/or number of holes 60 are increased, the spacing between adjacent holes 60 becomes smaller and the webs of material between the holes 60 become thinner. Sufficient thickness of the web material must be maintained so as to avoid structural weakness of the perforated plate 52. The maximum open area of perforated plate 50 for any given application may be determined either by finite element analysis (FEA), or classical analysis using the equations for design of tube sheets in shell-and-tube heat exchangers per ASME Code, Section VIII, Div. 1 Part UHX.

Figure 4A:
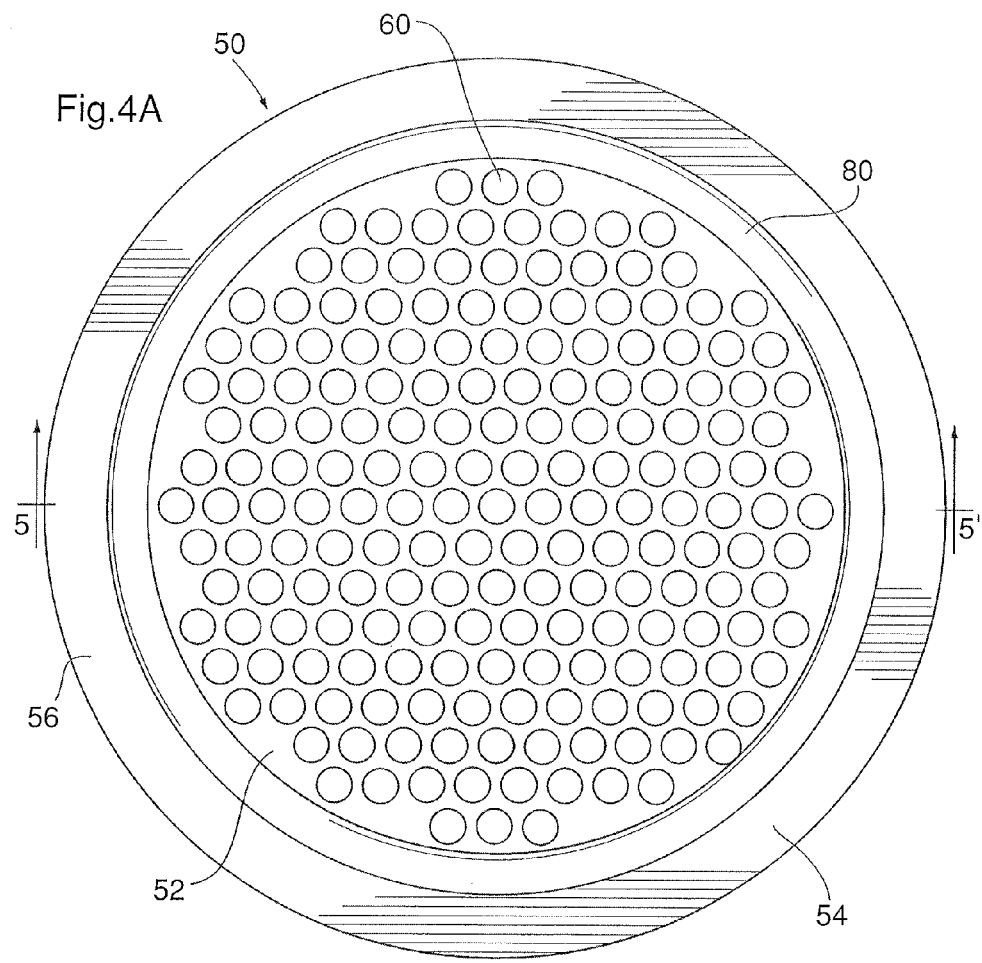
FIG. 4A is a plan view of the perforated plate of FIG. 3, showing the upstream surface.
Figure 5:
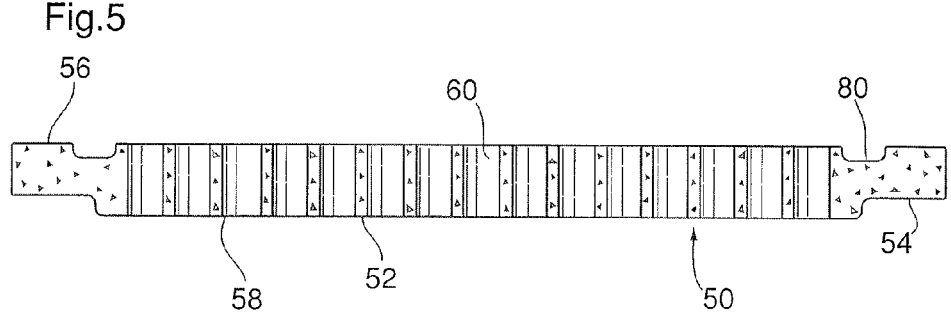
FIG. 5 is a cross-section along line 5-5 of FIG. 4.
Figure 4B:
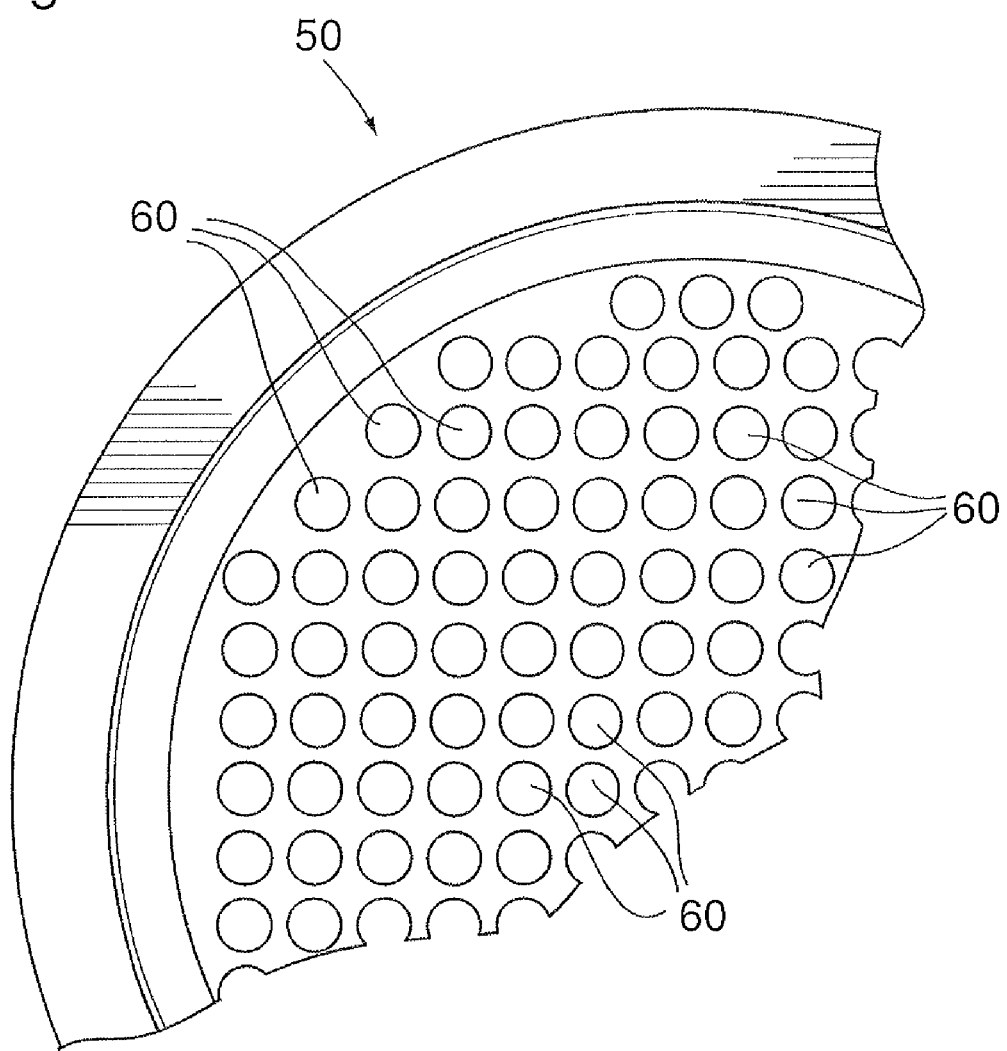
FIG. 4B shows a portion of a perforated plate having a square pitch hole pattern.

In the example shown in the drawings, the perforated plate 50 has 187 holes, each having a diameter of about 25 mm diameter. This perforated plate 50 is configured for use in a duct 11 having a maximum internal diameter of about 500 mm, resulting in an open area of approximately 45-50 percent. The holes 60 are preferably arranged in a regular pattern throughout the central portion 52. For example, the holes 60 may be arranged in a triangular pitch pattern, as shown in FIGS. 3 and 4A, or in a square pattern as shown in FIG. 4B. The triangular pitch hole pattern provides a greater hole density, resulting in a plate with a greater open area.

Figure 9:
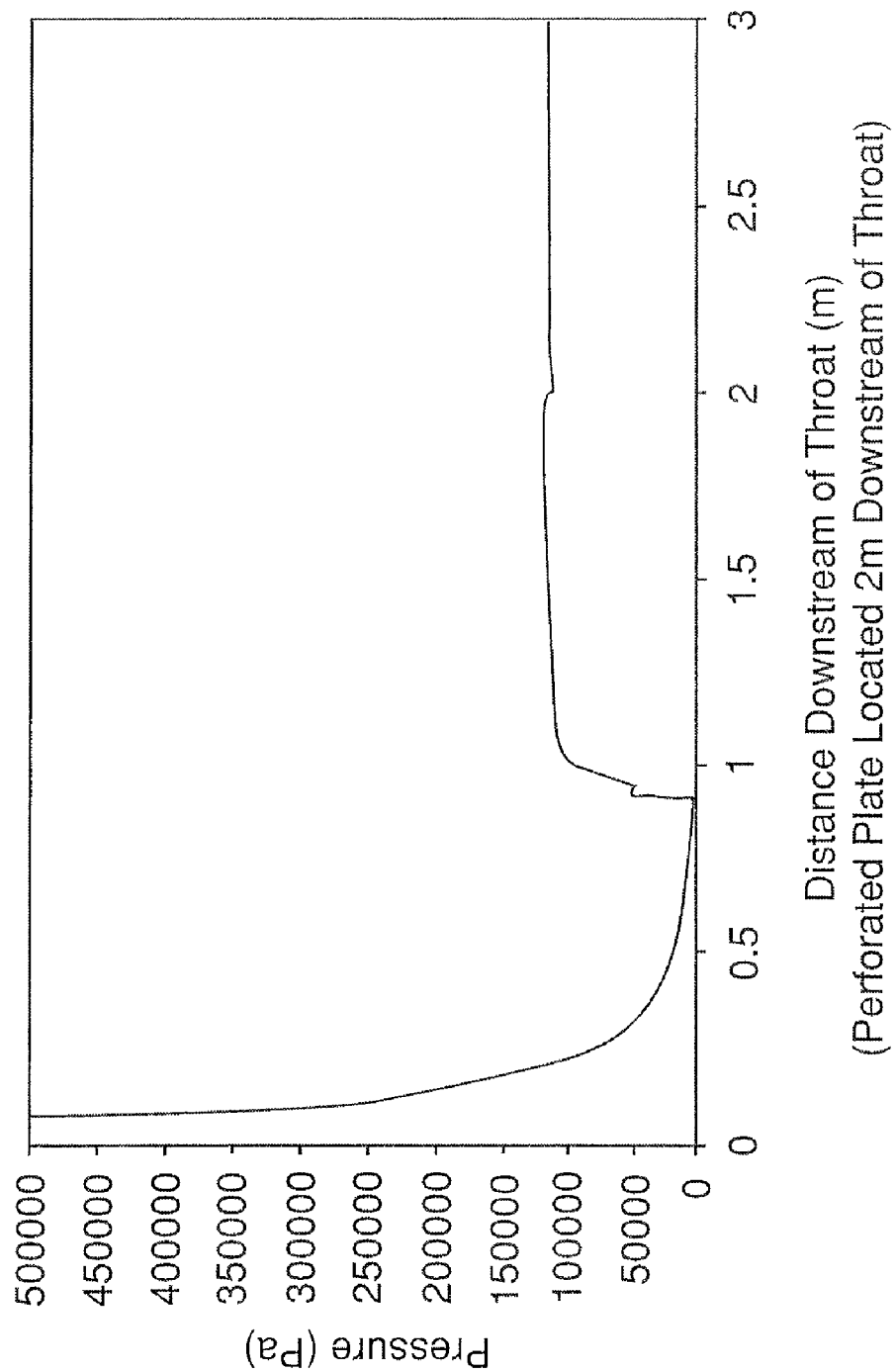
FIG. 9 is a graph showing the pressure distribution within an apparatus according to the invention.
Figure 10:
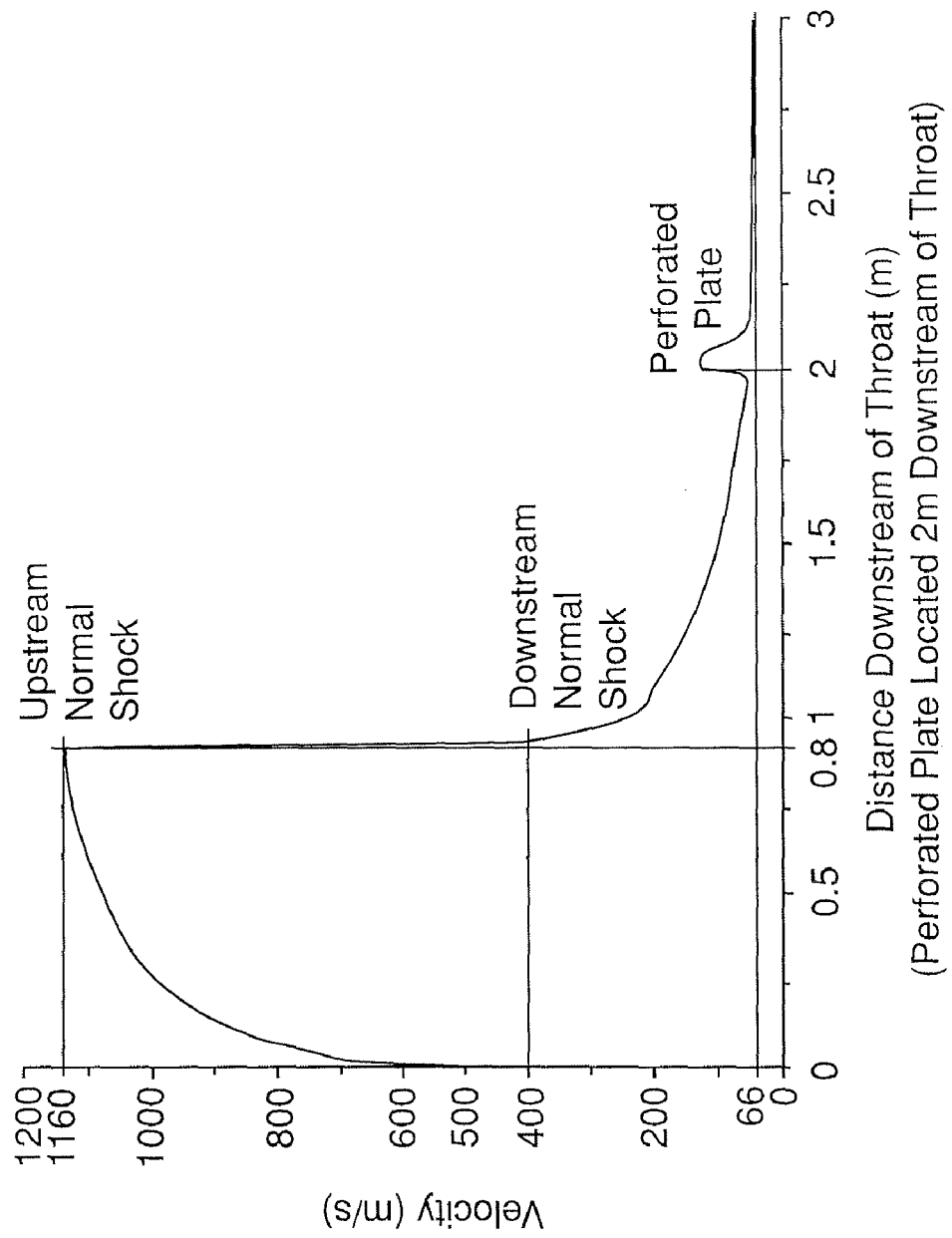
FIG. 10 is a graph showing the velocity distribution within an apparatus according to the invention.

The passage of the vent gas through the reduced open area of the holes 60 causes localized high-velocity low-pressure zones near the downstream end of the perforated plate 50. As pressure is inversely proportional to velocity, the pressure plot seen in FIG. 9 is a good indicator of the physical nature of the flow. The pressure at the throat (inlet) of duct 11 is about 40 bar and decreases rapidly as the vent gas expands within the upstream duct section 22. A large pressure rise is then seen at approximately 0.8 m, which corresponds to the sudden velocity reduction across the normal shock. The perforated plate 50 is located 2 m downstream, and a small pressure drop indicates flow acceleration through the holes 60 due to area reduction. Further downstream from the perforated plate 50, most of the pressure drop is recovered, indicating that the flow further decelerates before entry into the quench vessel 18. Overall, the apparatus according to the invention achieves a reduction in velocity from approximately Mach 3.5 (1160 m/s-FIG. 10) at the inlet 12 to Mach 0.2 (66 m/s-FIG. 10) at the outlet 14. This can be seen from FIG. 10, which shows the velocity distribution within the duct 11.

The perforated plate 50 is preferably comprised of a material which is resistant to erosion by the abrasive particulate entrained in the high-velocity vent gas. In an embodiment of the invention, the perforated plate 50 is formed from a ceramic material, such as a nitride-bonded silicon carbide. The perforated plate 50 is preferably of unitary structure, and wholly comprised of the ceramic material, to provide maximum resistance to erosion within the duct 11.

Although ceramics have excellent abrasion and temperature resistance, they have some limitations. For example, ceramic materials tend to fail in a brittle manner, with failure occurring abruptly without yielding as the rupture strength is exceeded. In order to reduce the possibility of failure, the stresses in the perforated plate 50 must be limited to those allowed for structural integrity. For example, expansion of the hot central portion 52 which is constrained by the relatively cool peripheral portion 54, results in compressive stress in the central portion 52 and tensile stress in the peripheral portion 54. These thermal stresses must be kept low in relation to the rupture strength of the ceramic material, which is accomplished in the present invention by permitting free radial and axial expansion of the perforated plate 50. An exemplary mounting arrangement which permits free expansion of the perforated plate 50 is now described below with reference to FIG. 6 and FIGS. 7A to 7C.

In the mounting arrangement shown in the drawings, the connection flanges 34, 38 are used both for connecting the upstream and downstream duct sections 22, 24 together, and for retaining the perforated plate 50. The connection flanges 34, 38 are each provided with a plurality of holes that are axially aligned to receive bolts 61, which are secured to flanges 34, 34 by nuts 63. In the construction of FIGS. 6 and 7A, the connection flanges 34, 38 are spaced apart from one another by an annular spacer ring 62 which is provided with a plurality of holes that are aligned with the holes of the connection flanges 34, 38 to receive the bolts 61.

The peripheral portion 54 of perforated plate 50 is secured between connection flanges 34, 38 along its upstream and downstream surfaces 56, 58 and inwardly of the spacer ring 62, preferably in a resilient manner. The spacer ring 62 preferably has an axial thickness that is at least as great as the axial thickness of the peripheral portion 54 of the perforated plate 50, so as to avoid the application of excessive clamping pressure to the peripheral portion 54, which would constrain thermal growth and produce excessive thermal stresses in the perforated plate 50.

Figure 6:
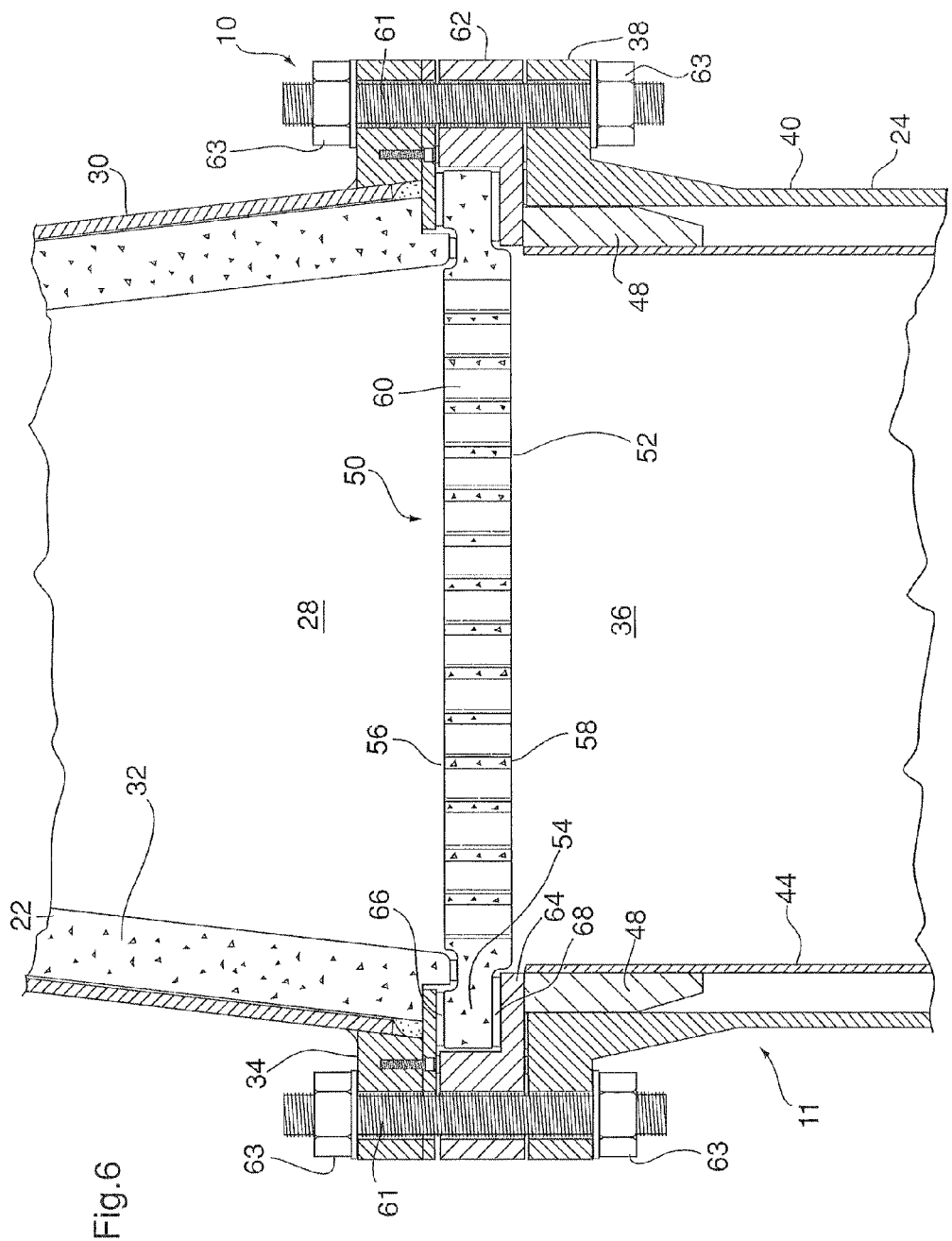
FIG. 6 is a partial cross-sectional side view showing the portions of apparatus immediately upstream and downstream of the perforated plate.
Figure 7A:
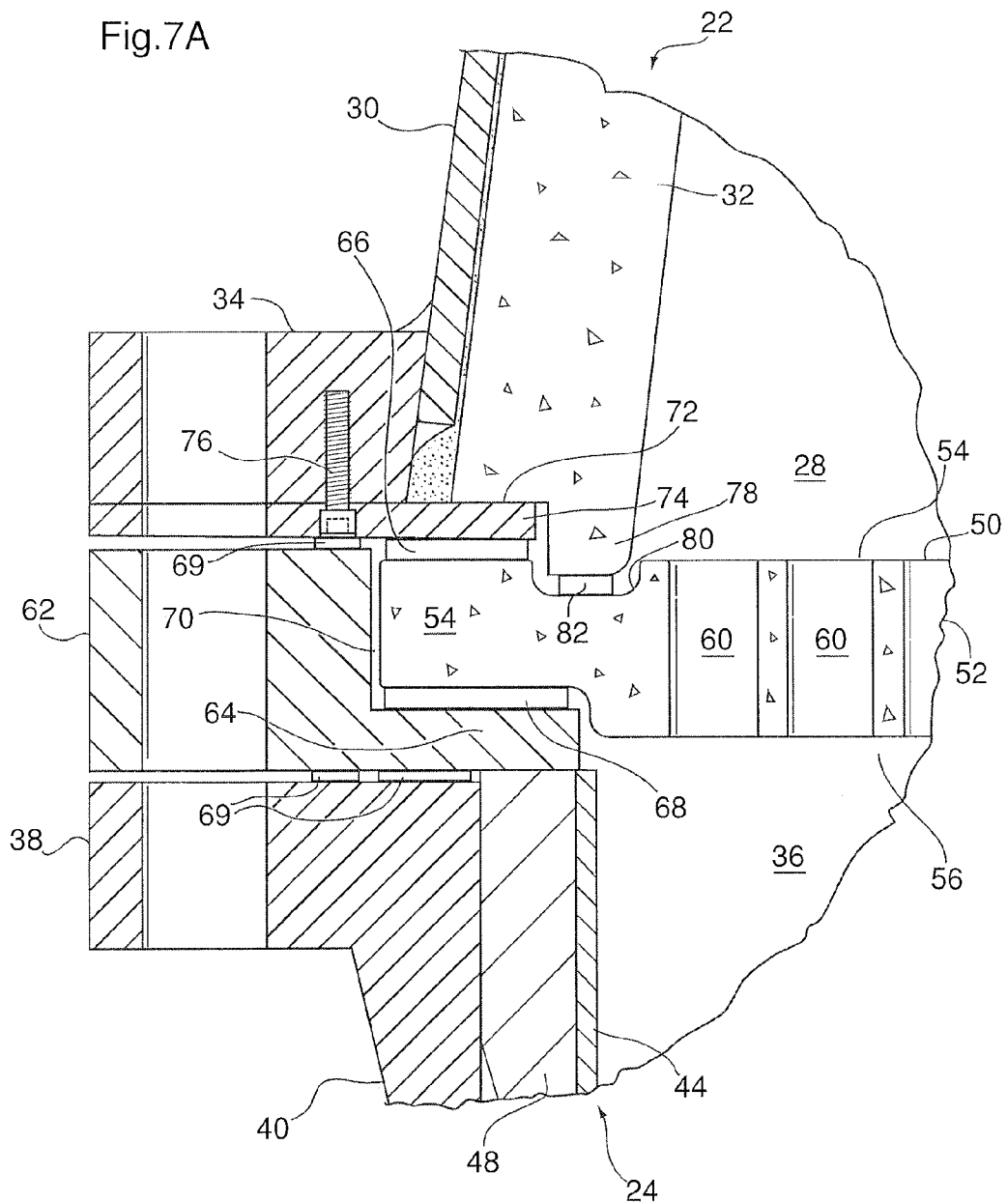
FIG. 7A is a close-up view of the left hand side of FIG. 6, showing the manner in which the perforated plate is retained along its outer periphery.

In the embodiment shown in FIGS. 6 and 7A, the spacer ring 62 also comprises an inwardly extending support flange 64, with the peripheral portion 54 of perforated plate 50 being resiliently secured between the upstream surface of the support flange 64 and the downstream surface of radial flange 34. The gap between the support flange 64 and the radial flange 34 of upstream section 22 is greater than the thickness of the peripheral portion 54 of perforated plate 50, so as to permit the insertion of a resilient packing material between the perforated plate 50 and flanges 34, 64. In particular, a first body of resilient packing material 66, which is preferably in the form of an annular ring or gasket, is provided between the connection flange 34 and the upstream surface of peripheral portion 54 of the perforated plate 50. Similarly, a second body of resilient packing material 68, which may also be in the form of an annular ring or gasket, is provided between the downstream surface of peripheral portion 54 and the support flange 64. The resilient mounting of the perforated plate 50 in this manner permits free thermal expansion in the axial direction while holding the perforated plate 50 with sufficient force to prevent it from vibrating.

In the embodiment shown in FIGS. 6 and 7A, the support flange 64 of spacer ring 62 also serves to support the inner sidewall 44 of the downstream duct section 24. In particular, the upstream end of sidewall 44 is secured to the inner edge of the support flange 64, for example by welding.

Figure 7B:
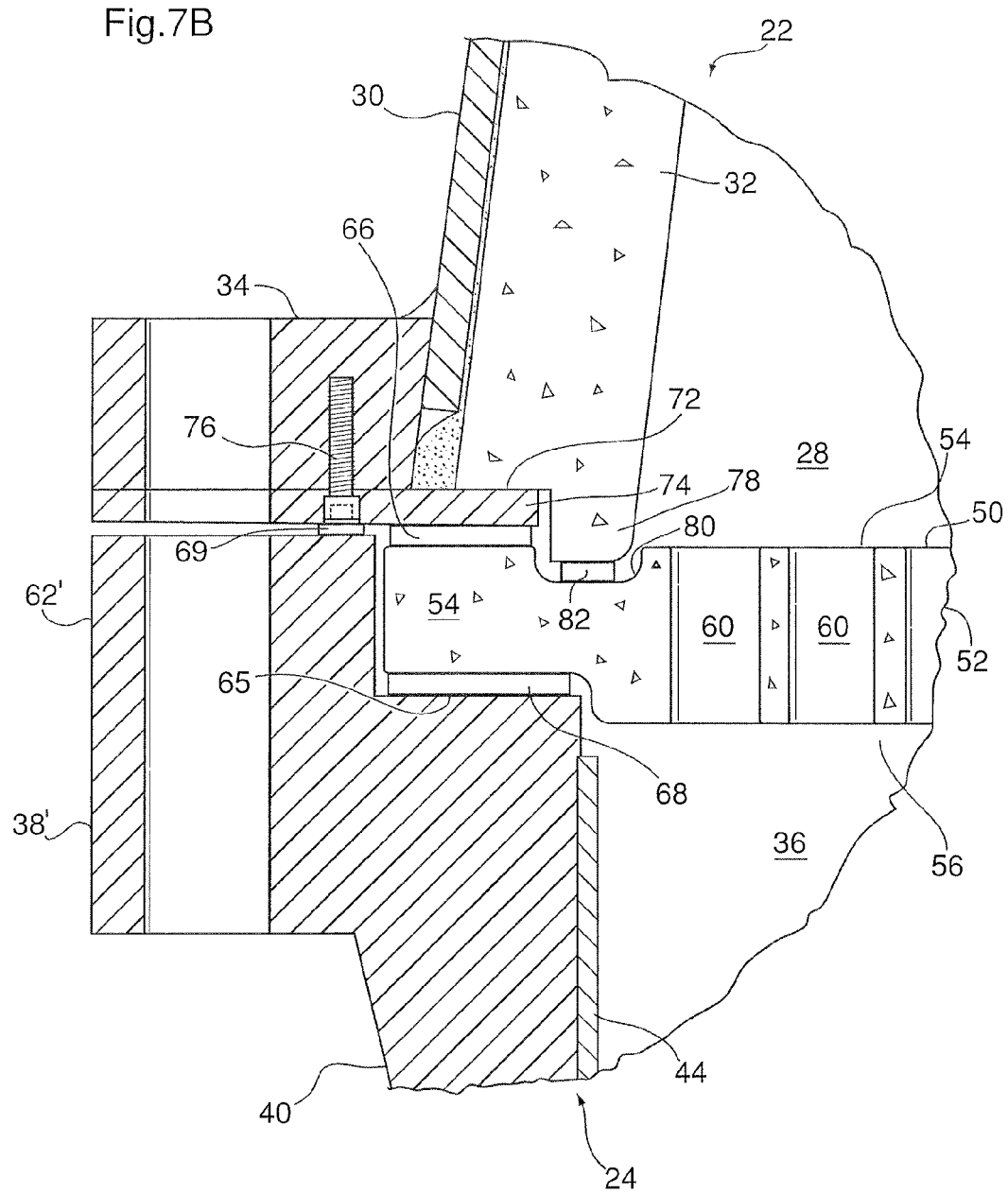

The structure of the connection flanges 34, 38 may differ from that shown in the drawings. For example, the provision of a separate spacer ring 62 is not essential, and the spacer ring 62 may be incorporated into the connection flanges 34, 38, by providing one or both of the connection flanges 34, 38 with axially extending lips located outwardly of the edge of the peripheral portion 54 of perforated plate 50. Such a construction is shown in FIG. 7B, which is identical to the construction shown in FIG. 7A, except in the structure of the connection flange of downstream duct section 24, this connection flange being designated by reference numeral 38' in FIG. 7B. Connection flange 38' is constructed so as to eliminate the need for a separate spacer ring 62, having an inner radial surface 65 on which the peripheral portion 54 of perforated plate 50 is supported, with the packing material 68 being provided between the peripheral portion 54 and the radial surface 65. The connection flange 38' is also provided with an outer annular lip 62' which functions as a spacer ring between connection flanges 34, 38' and prevents the application of excessive clamping pressure to peripheral portion 54 of perforated plate 50.

Even where a spacer ring 62 is used, it is not necessarily provided with a support flange 64. Such a construction is shown in FIG. 7C, which is identical to the construction shown in FIG. 7A, except in the structure of the connection flange of the downstream section and the spacer ring, these elements being identified by reference numerals 38" and 62" respectively. As in FIG. 7B, connection flange 38" has an inner radial surface on which the peripheral portion 54 of perforated plate 50 is supported. The spacer ring 62" of FIG. 7C functions merely as a spacer to prevent the application of excessive clamping pressure to plate 50, and does not have a support flange 64.

Radial expansion of the perforated plate 50 is accommodated by providing an annular expansion gap around the outer periphery of the perforated plate 50. As shown in the drawings, the annular expansion gap 70 is provided between the outer edge of peripheral portion 54 and the inner surface of spacer ring 62.

The resilient packing materials 66, 68 which separate the perforated plate 50 from flanges 34, 64 may be made from any heat-resistant, compressible, and resilient material. In an embodiment of the invention, the packing materials 66, 68 may be comprised of a fluorinated polymeric material such as polytetrafluoroethylene (PTFE), which may be reinforced by fibers, such as glass fibers. The inventors have found that PTFE polymers having a compressibility of about 30-40 percent are suitable for use as packing materials. Similar bodies of suitable packing materials 69 are provided between the spacer ring 62 and the flanges 34, 38.

The present invention also provides a structure whereby the resilient packing materials 66, 68, which are susceptible to erosion by the autoclave vent gas, are shielded from the gas flow. This structure is now described with reference to FIGS. 6 and 7. As shown, a tongue-and-groove type joint may be formed between the inner lining 32 of the upstream duct section 22 and the peripheral portion 54 of the perforated plate 50. The ceramic lining 32 has a radial surface 72 at its downstream end. The radial surface 72 is in direct contact with an inwardly extending portion 74 of flange 34, which extends inwardly of the metal shell 30 and supports the ceramic lining 32. In order to permit removal and replacement of the lining 32, the inwardly extending portion 74 of flange 34 may be in the form of an annular plate that is secured to the flange 34 by bolts 76 or the like. Located inwardly of radial surface 72, the inner lining 32 is provided with an axially extending annular lip 78, which extends into an annular groove 80 in the upstream surface 56 of perforated plate 50, the groove 80 being located between the peripheral portion 54 and the central portion 52 of the perforated plate 50. Preferably, a gap is provided between the annular lip 78 and the groove 80, and a third body of resilient packing material 82 is provided in the groove 80, to seal the gap and prevent contact between the perforated plate 50 and the ceramic insert 32. Preferably, the third body of resilient material 82 is in the form of an annular ring or gasket, which may be comprised of the same resilient material as resilient packing materials 66, 68. It can be seen that the provision of the protective joint between the perforated plate 50 and inner lining 32 substantially shields the packing materials 66, 68 and 82 from the erosive effects of the vent gas stream.

It can be seen that the support structure for perforated plate 50 described above protects the perforated plate 50 from the effects of thermal stresses and also minimizes contact between the vent gas and components of apparatus 10 that are susceptible to erosion by the vent gas. In addition, the structure of the perforated plate 50 is preferably optimized so as to minimize the possibility of damage or failure caused by thermal stresses. In this regard, the inventors have discovered that the highest stresses on the perforated plate 50 are near its outer edge, and particularly at the corners which form transitions between the various surfaces of the perforated plate 50. An area of particularly high stress is the outside peripheral edge of the groove 80, located at the transition of the groove 80 and peripheral portion 54, where the thickness of the perforated plate 50 is at a minimum. The inventors have found that it is important to provide the perforated plate 50 with smooth radii at corners. For example, the inner and outer edges of the groove 80 are radiused, as is the transition between the central portion 52 and peripheral portion 54 on the downstream surface 58 of the perforated plate 50. The inventors have found that a suitable radius for inside (concave) corners is about 6 mm. Outside corners, such as at the peripheral edges of the holes 60, are also preferably radiused by about 1 mm.

As mentioned above, the resilient packing materials 66, 68 hold the perforated plate 50 sufficiently tightly to prevent vibration while compressing to minimize thermal stresses. In order to further minimize the potential for vibration, the perforated plate is constructed so that its first and second natural frequencies are different from the vibrational frequencies of the vent gas jet. In this regard, the inventors have found that the first and second natural frequencies can be calculated by axially restraining the perforated plate 50 around its upstream edge. If these natural frequencies of the perforated plate 50 are too close to the vibrational frequencies of the vent gas jet, the structure of the perforated plate 50 can be adjusted so as to change its natural frequencies, which is typically done by adjusting the nominal thickness of the perforated plate 50 to change its mass. In an embodiment of the invention, the central portion of the perforated plate 50 has a thickness of about 50 mm, and was found to have a first natural frequency of 442 Hz, sufficiently high to avoid vibrations caused by the vent gas jet. Typically the thickness of the perforated plate 50 is dictated by the structural integrity of the ceramic material, rather than the need to minimization vibration.

Although the invention has been described in connection with certain embodiments, it is not limited thereto. Rather, the invention includes all embodiments which may fall within the scope of the following claims.

What is claimed is:

1. An apparatus for reducing pressure and velocity of a supersonic vent gas stream from a pressure vessel, the apparatus comprising:
    a) a duct extending along an axis and having an upstream portion and a downstream portion, wherein the upstream portion has an inlet for receiving the vent gas stream and diverges toward the downstream portion along at least a part of its length; wherein the upstream portion and the downstream portion of the duct have radial flanges along which they are secured together;
    b) a perforated plate provided inside said duct and axially positioned between the upstream and downstream portions of the duct, wherein the perforated plate has an upstream surface, an opposed downstream surface, a central portion and a peripheral portion, wherein the central portion of the perforated plate is provided with a plurality of holes extending through the perforated plate from the upstream surface to the downstream surface so as to permit the vent gas stream to flow through the perforated plate from the upstream portion of the duct to the downstream portion of the duct, and wherein the peripheral portion of the perforated plate is resiliently secured between the radial flanges of the upstream and downstream portions of the duct;
    c) a first body of resilient packing material provided between the radial flange of the upstream portion of the duct and the upstream surface of the peripheral portion of the perforated plate; and
    d) a second body of resilient packing material provided between the downstream surface of the peripheral portion of the perforated plate and an upstream surface of the support ring.

2. The apparatus of claim 1, wherein the perforated plate comprises a unitary structure and is wholly comprised of a ceramic material.

3. The apparatus of claim 1, wherein the plurality of holes in the central portion provide the perforated plate with a total open area of from about 40 percent to about 60 percent of a maximum internal area of the duct.

4. The apparatus of claim 1, further comprising an annular support ring provided between the downstream surface of the peripheral portion of the perforated plate and the radial flange of the downstream portion of the duct.

5. The apparatus of claim 1, wherein a radial expansion gap is provided around the peripheral portion of the perforated plate.

6. The apparatus of claim 1, wherein an annular groove is provided in the upstream surface of the perforated plate between the central portion and the peripheral portion thereof, wherein the groove is spaced radially inwardly of the radial flange of the upstream portion of the duct.

7. The apparatus of claim 6, wherein the upstream portion of the duct has an annular lip which is located at its downstream end and is spaced radially inwardly from the radial flange, wherein the lip extends in a downstream direction into said groove of the perforated plate.

8. The apparatus of claim 1, wherein the downstream portion of the duct comprises an outer sidewall which comprises a nozzle of a quench vessel, wherein the outer sidewall has a first end on which the radial flange of the upstream portion is mounted, and a second end attached to the quench vessel and surrounding a vent gas inlet opening of the quench vessel.

9. The apparatus of claim 8, wherein the downstream portion of the duct further comprises an inner sidewall which is concentric with, and spaced from, the outer sidewall, wherein the inner sidewall has a first end proximate to the lower surface of the perforated plate and a second end which extends into the vent gas inlet opening of the quench vessel.

10. The apparatus of claim 9, wherein the first end of the inner sidewall has a diameter which is substantially the same as a diameter of the central portion of the perforated plate.

11. The apparatus of claim 10, wherein the first end of the inner sidewall is attached to a radial flange which extends along the downstream surface of the peripheral portion of the perforated plate.

12. The apparatus of claim 1, wherein the central portion of the perforated plate is thicker than the peripheral portion of the perforated plate.

13. The apparatus of claim 1, wherein the holes in the central portion of the perforated plate are circular and are arranged in either a triangular or square pitch pattern.

14. The apparatus of claim 1, wherein the peripheral portion of the perforated plate is without holes.

15. An apparatus for reducing pressure and velocity of a supersonic vent gas stream from a pressure vessel, the apparatus comprising:
   a) a duct extending along an axis and having an upstream portion and a downstream portion, wherein the upstream portion has an inlet for receiving the vent gas stream and diverges toward the downstream portion along at least a part of its length;
   b) a perforated plate provided inside said duct and axially positioned between the upstream and downstream portions of the duct, wherein the perforated plate has an upstream surface, an opposed downstream surface, a central portion and a peripheral portion, wherein the central portion of the perforated plate is provided with a plurality of holes extending through the perforated plate from the upstream surface to the downstream surface so as to permit the vent gas stream to flow through the perforated plate from the upstream portion of the duct to the downstream portion of the duct, and wherein the peripheral portion of the perforated plate is secured to the duct along the upstream and downstream surfaces of the perforated plate;
   wherein an annular groove is provided in the upstream surface of the perforated plate between the central portion and the peripheral portion thereof, wherein the groove is spaced radially inwardly of the radial flange of the upstream portion of the duct;
   wherein the upstream portion of the duct has an annular lip which is located at its downstream end and is spaced radially inwardly from the radial flange, wherein the lip extends in a downstream direction into said groove of the perforated plate; and
   wherein a gap is provided between the annular lip and a lower surface of the groove, and wherein a third body of resilient packing material is provided in said groove and sealingly engages both the annular lip and the upper surface of the perforated plate.

16. The apparatus of claim 15, wherein the upper portion of the duct comprises an outer metal shell and an inner ceramic lining, wherein the radial flange of the upper portion of the duct is attached to the outer metal shell and the annular lip forms part of said inner ceramic lining.

* * * * *